US011624915B2

United States Patent
Hong

(10) Patent No.: US 11,624,915 B2
(45) Date of Patent: Apr. 11, 2023

(54) NEAR-EYE DISPLAY DEVICE AND NEAR-EYE DISPLAY METHOD

(71) Applicant: BOE Technology Group Co., Ltd., Beijing (CN)

(72) Inventor: Tao Hong, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 401 days.

(21) Appl. No.: 16/763,368

(22) PCT Filed: Oct. 24, 2019

(86) PCT No.: PCT/CN2019/113076
§ 371 (c)(1),
(2) Date: May 12, 2020

(87) PCT Pub. No.: WO2020/147364
PCT Pub. Date: Jul. 23, 2020

(65) Prior Publication Data
US 2021/0208400 A1  Jul. 8, 2021

(30) Foreign Application Priority Data
Jan. 18, 2019 (CN) .......................... 201910048296.7

(51) Int. Cl.
G02B 27/01 (2006.01)
G02B 27/28 (2006.01)
G02B 30/25 (2020.01)

(52) U.S. Cl.
CPC ....... *G02B 27/0172* (2013.01); *G02B 27/283* (2013.01); *G02B 27/286* (2013.01); *G02B 30/25* (2020.01)

(58) Field of Classification Search
CPC .... G02B 27/172; G02B 27/283; G02B 30/25; G02B 27/286
(Continued)

(56) References Cited

U.S. PATENT DOCUMENTS

2011/0032485 A1* 2/2011 Hsiung ............. G03B 21/2033
353/121
2017/0336628 A1  11/2017 Kim et al.
(Continued)

FOREIGN PATENT DOCUMENTS

CN  107870715 A  4/2018
CN  108347597 A  7/2018
(Continued)

OTHER PUBLICATIONS

Machine Translation of 109100866 (Year: 2022).*
Dec. 20, 2019—(CN) First Office Action Appn 201910048296.7 with English Translation.

*Primary Examiner* — Jerry L Brooks
(74) *Attorney, Agent, or Firm* — Banner & Witcoff, Ltd.

(57) ABSTRACT

A near-eye display device and a near-eye display method are provided. In the near-eye display device and method, displaying a first image and a second image in different time periods by using a display portion; converting light of the first image to first linearly polarized light and converting light of the second image to second linearly polarized light by using a polarization conversion portion, a polarization direction of the first linearly polarized light being different from that of the second linearly polarized light; receiving the first linearly polarized light and the second linearly polarized light, and causing them to be emitted towards different directions by using a polarization splitting portion; and transmitting the first linearly polarized light and transmitting the second linearly polarized light by using an image light transmission portion.

19 Claims, 4 Drawing Sheets

(58) Field of Classification Search
USPC .......................................................... 359/630
See application file for complete search history.

(56) References Cited

U.S. PATENT DOCUMENTS

| 2018/0089871 A1 | 3/2018 | Ko et al. |
| 2018/0210222 A1 | 7/2018 | Seo et al. |
| 2019/0293965 A1 | 9/2019 | Liao |
| 2020/0150429 A1 | 5/2020 | Hong |

FOREIGN PATENT DOCUMENTS

| CN | 108572453 A | | 9/2018 | |
| CN | 109100866 A | * | 12/2018 | ......... G02B 27/0101 |
| CN | 109100866 A | | 12/2018 | |
| CN | 109188700 A | | 1/2019 | |
| CN | 109613705 A | | 4/2019 | |
| WO | 02091062 A1 | | 11/2002 | |

* cited by examiner

NEAR-EYE DISPLAY DEVICE AND NEAR-EYE DISPLAY METHOD

CROSS-REFERENCE TO RELATED APPLICATION

The application is a U.S. National Phase Entry of International Application No. PCT/CN2019/113076 filed on Oct. 24, 2019, designating the United States of America and claiming priority to Chinese Patent Application No. 201910048296.7, filed on Jan. 18, 2019. The present application claims priority to and the benefit of the above-identified applications and the above-identified applications are incorporated by reference herein in their entirety.

TECHNICAL FIELD

At least one embodiment of the present disclosure relates to a near-eye display device and a near-eye display method.

BACKGROUND

In the field of near-eye display, when an augmented reality (AR) device (e.g., Hololens from Microsoft) is worn by a user, a three-dimensional (3D) object as displayed is a stereoscopic vision formed by displaying different images for a left eye and a right eye of the user, respectively.

SUMMARY

At least one embodiment of the present disclosure relates to a near-eye display device and a near-eye display method.

At least one embodiment of the present disclosure provides a near-eye display device, which includes: a display portion, configured to display a first image in a first time period and display a second image in a second time period; a polarization conversion portion, configured to convert light of the first image to first linearly polarized light, and convert light of the second image to second linearly polarized light, a polarization direction of the first linearly polarized light being different from a polarization direction of the second linearly polarized light; a polarization splitting portion, configured to receive the first linearly polarized light and the second linearly polarized light, cause the first linearly polarized light to be emitted towards a first direction and cause the second linearly polarized light to be emitted towards a second direction, the first direction being different from the second direction; and an image light transmission portion, configured to transmit the first linearly polarized light in the first time period, and configured to transmit the second linearly polarized light in the second time period.

For example, the display portion, the polarization conversion portion and the image light transmission portion are disposed sequentially.

For example, the device further includes a projection portion, the projection portion is located between the display portion and the polarization conversion portion; the projection portion is configured to project the first linearly polarized light and the second linearly polarized light; and the polarization splitting portion is configured to receive the first linearly polarized light and the second linearly polarized light as projected by the projection portion.

The image light transmission portion is configured to transmit the first linearly polarized light in the first time period and form a first virtual image located in a first image surface, and is configured to transmit the second linearly polarized light in the second time period and form a second virtual image located in a second image surface; the first image surface is different from the second image surface; and an extension line of a connecting line of centers of the first virtual image and the second virtual image passes through the polarization splitting portion.

For example, the first virtual image and the second virtual image are focused to a same focus position; a distance from the first virtual image to the focus position is greater than 1 m and is smaller than 10 m; and a distance from the second virtual image to the focus position is greater than 1 m and is smaller than 10 m.

For example, a viewing angle of the first virtual image and a viewing angle of the second virtual image both are greater than 40°.

For example, the first image surface is parallel to the second image surface.

For example, the polarization splitting portion includes a light incoming surface configured to receive the first linearly polarized light and the second linearly polarized light; the image light transmission portion includes a first image light transmission sub-portion and a second image light transmission sub-portion, the first image light transmission sub-portion and the second image light transmission sub-portion are disposed at two sides of the polarization splitting portion, respectively; the first image light transmission sub-portion is located at a side of the polarization splitting portion where the light incoming surface is located, and the second image light transmission sub-portion is located at a side of the polarization splitting portion opposite to the light incoming surface; the extension line of the connecting line of centers of the first virtual image and the second virtual image passes through the first image light transmission sub-portion.

For example, the first image light transmission sub-portion includes a first phase retarder and a first reflective surface, the first phase retarder is closer to the polarization splitting portion than the first reflective surface to the polarization splitting portion; the first phase retarder is configured to receive the first linearly polarized light emitted towards the first direction and convert the first linearly polarized light to first circularly polarized light; the first reflective surface is configured to reflect the first circularly polarized light and convert the first circularly polarized light to second circularly polarized light; the first phase retarder is further configured to receive the second circularly polarized light and convert the second circularly polarized light to third linearly polarized light; the third linearly polarized light is transmitted through the polarization splitting portion to form the first virtual image located in the first image surface; the second image light transmission sub-portion includes a second reflective surface and a second phase retarder, the second phase retarder is closer to the polarization splitting portion than the second reflective surface to the polarization splitting portion; the second phase retarder is configured to receive the second linearly polarized light emitted towards the second direction and convert the second linearly polarized light to third circularly polarized light; the second reflective surface is configured to reflect the third circularly polarized light and convert the third circularly polarized light to fourth circularly polarized light; the second phase retarder is further configured to receive the fourth circularly polarized light and convert the fourth circularly polarized light to fourth linearly polarized light; the fourth linearly polarized light is reflected by the polarization splitting portion to form the second virtual image located in the second image surface.

For example, a focal power of the first reflective surface is different from a focal power of the second reflective surface.

For example, a reflectivity of the first reflective surface is as same as a reflectivity of the second reflective surface.

For example, an included angle between the first phase retarder and the polarization splitting portion is an acute angle; an included angle between the second phase retarder and the polarization splitting portion is an acute angle.

For example, the device further includes a transflective portion, the transflective portion is configured to transmit ambient light, the transflective portion includes a first transflective sub-portion and a second transflective sub-portion, the first reflective surface is located between the first transflective sub-portion and the second transflective sub-portion, and a refractivity of the first transflective sub-portion is as same as a refractivity of the second transflective sub-portion.

For example, the first linearly polarized light and the fourth linearly polarized light have a first polarization direction; the second linearly polarized light and the third linearly polarized light have a second polarization direction; the first polarization direction is perpendicular to the second polarization direction; a rotation direction of the first circularly polarized light is opposite to a rotation direction of the second circularly polarized light; and a rotation direction of the third circularly polarized light is opposite to a rotation direction of the fourth circularly polarized light.

For example, both the first linearly polarized light and the fourth linearly polarized light are S-polarized light, and both the second linearly polarized light and the third linearly polarized light are P-polarized light.

At least one embodiment of the present disclosure further provides a near-eye display method, which includes: displaying a first image in a first time period and displaying a second image in a second time period, by using a display portion; converting light of the first image to first linearly polarized light, and converting light of the second image to second linearly polarized light, by using a polarization conversion portion, a polarization direction of the first linearly polarized light being different from a polarization direction of the second linearly polarized light; receiving the first linearly polarized light and the second linearly polarized light, causing the first linearly polarized light to be emitted towards a first direction and causing the second linearly polarized light to be emitted towards a second direction, by using a polarization splitting portion, the first direction being different from the second direction; and transmitting the first linearly polarized light in the first time period and transmitting the second linearly polarized light in the second time period, by using an image light transmission portion.

For example, transmitting the first linearly polarized light in the first time period to form a first virtual image located in a first image surface, and transmitting the second linearly polarized light in the second time period to form a second virtual image located in a second image surface, by using the image light transmission portion; the first image surface is different from the second image surface; and an extension line of a connecting line of centers of the first virtual image and the second virtual image passes through the polarization splitting portion.

For example, the method further includes projecting the first linearly polarized light and the second linearly polarized light, by using a projection portion; and receiving the first linearly polarized light and the second linearly polarized light as projected by the projection portion, by using the polarization splitting portion.

For example, the method further includes: providing a transflective portion to transmit ambient light.

For example, the method further includes: receiving the first linearly polarized light emitted towards the first direction and converting the first linearly polarized light to first circularly polarized light, by using a first phase retarder; reflecting the first circularly polarized light and converting the first circularly polarized light to second circularly polarized light, by using a first reflective surface; receiving the second circularly polarized light and converting the second circularly polarized light to third linearly polarized light, by using the first phase retarder, wherein the third linearly polarized light is transmitted through the polarization splitting portion to form the first virtual image located in the first image surface; receiving the second linearly polarized light emitted towards the second direction and converting the second linearly polarized light to third circularly polarized light, by using a second phase retarder; reflecting the third circularly polarized light and converting the third circularly polarized light to fourth circularly polarized light, by using a second reflective surface; receiving the fourth circularly polarized light and converting the fourth circularly polarized light to fourth linearly polarized light, by using the second phase retarder, wherein the fourth linearly polarized light is reflected by the polarization splitting portion to form the second virtual image located in the second image surface; the first linearly polarized light and the fourth linearly polarized light have a first polarization direction; the second linearly polarized light and the third linearly polarized light have a second polarization direction; the first polarization direction is perpendicular to the second polarization direction; a rotation direction of the first circularly polarized light is opposite to a rotation direction of the second circularly polarized light; and a rotation direction of the third circularly polarized light is opposite to a rotation direction of the fourth circularly polarized light.

BRIEF DESCRIPTION OF THE DRAWINGS

In order to more clearly illustrate the technical solution of the embodiments of the present disclosure, the drawings of the embodiments will be briefly described in the following. It is obvious that the described drawings below are only related to some embodiments of the present disclosure without constituting any limitation thereto.

DETAILED DESCRIPTION

Figure 1:
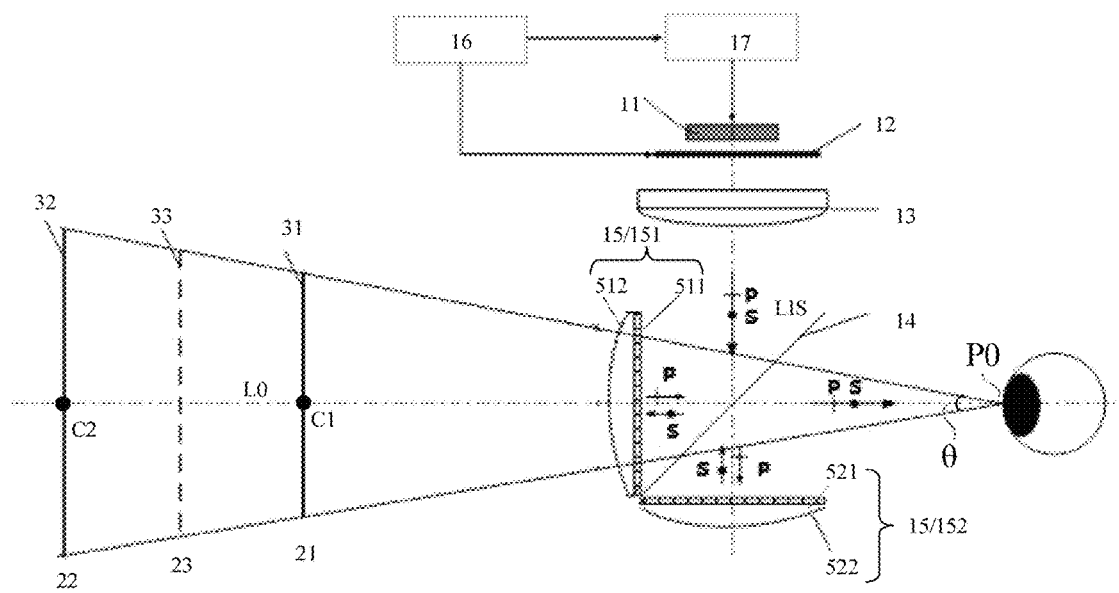
FIG. 1 is a schematic diagram of a near-eye display device provided by an embodiment of the present disclosure.

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the described object is changed, the relative position relationship may be changed accordingly.

Because 3D display based on binocular stereoscopic vision involves problems of convergence-adjusting conflict, long wear thereof may cause fatigue and dizziness of user's eyes, which is an issue to be urgently solved in stereoscopic display. Light field display provides one of feasible methods for solving the fatigue and dizziness issue of user's eyes. That is, realizing natural 3D display by simulating a light field of a natural 3D object to mitigate fatigue and dizziness of human eyes. Apart from holographic display, methods for realizing light field display mainly include integral imaging display by adopting a micro-lens array, and also include multi-screen display by adopting a multilayered display screen.

Light field imaging technology is capable of simulating the law of the natural world, so that an observer observes a vivid 3D image. The light field imaging technology mainly utilizes two methods of space multiplexing and time multiplexing, in which the space multiplexing method is to realize 3D display effect by imaging an image onto different focus positions, while the time multiplexing method mainly utilizes high-speed elements to quickly generate different focus positions for the image, so that the observer can feel simultaneous occurrence of the image at different focus positions due to the persistence of vision, thereby realizing 3D display effect.

FIG. 1 is a schematic diagram of a near-eye display device provided by an embodiment of the present disclosure. An embodiment of the present disclosure provides a near-eye display device, as illustrated in FIG. 1, including a display portion 11, a polarization conversion portion 12, a projection portion 13, a polarization splitting portion 14 and an image light transmission portion 15.

The display portion 11 is configured to display a first image in a first time period and display a second image in a second time period.

The polarization conversion portion 12 is configured to convert light of the first image to first linearly polarized light, and convert light of the second image to second linearly polarized light; a polarization direction of the first linearly polarized light is different from a polarization direction of the second linearly polarized light.

The projection portion 13 is configured to project the first linearly polarized light and the second linearly polarized light.

The polarization splitting portion 14 is configured to receive the first linearly polarized light and the second linearly polarized light as projected by the projection portion 13, cause the first linearly polarized light to be emitted towards a first direction and cause the second linearly polarized light to be emitted towards a second direction; and the first direction is different from the second direction.

The image light transmission portion 15 is configured to transmit the first linearly polarized light in the first time period and configured to transmit the second linearly polarized light in the second time period.

For example, the image light transmission portion 15 is configured to transmit the first linearly polarized light in the first time period and form a first virtual image 31 located in a first image surface 21, and is configured to transmit the second linearly polarized light in the second time period and form a second virtual image 32 located in a second image surface 22; the first image surface 21 is different from the second image surface 22; and an extension line of, a connecting line L0 of a center C1 of the first virtual image 31 and a center C2 of the second virtual image 32, passes through the polarization splitting portion 14.

In the embodiment of the present disclosure, the extension line of the connecting line L0 of the center C1 of the first virtual image 31 and the center C2 of the second virtual image 32 passes through the polarization splitting portion 14, which facilitates to realize near-eye display. In near-eye display, a near-eye display device is very close to the eye. For example, a distance from the eye to the near-eye display device is not greater than 10 cm, further, for example, not greater than 5 cm, without limited thereto. For example, in the embodiment of the present disclosure, the near-eye display device is a binocular near-eye display device, and the eye in FIG. 1 may be a left eye or a right eye.

For example, as illustrated in FIG. 1, the display portion 11, the polarization conversion portion 12, the projection portion 13 and the image light transmission portion 15 are disposed sequentially.

For example, the first time period and the second time period constitute one display cycle, and the display cycle is smaller than a refresh time of human eyes. Generally, the refresh time of human eyes is 1/30 second.

The near-eye display device provided by the embodiment of the present disclosure utilizes the time multiplexing method to display the first image and the second image at different time moments, and convert light of the first image and light of the second image through different light paths, respectively, to form the first virtual image 31 and the second virtual image 32, respectively, thereby realizing natural 3D display based on light field.

As illustrated in FIG. 1, a distance from the first virtual image 31 to the human eye is different from a distance from the second virtual image 32 to the human eye. A perceived image 33 obtained by a deep merge of the first virtual image 31 and the second virtual image 32 is located in a third image surface 23, and the third image surface 23 is located between the first image surface 21 and the second image surface 22. When images are successively displayed, the difference between the images as displayed allows the perceived image surface 23 of the perceived image 33 to be changed between the first image surface 21 and the second image surface 22, so that the near-eye display device provided by the embodiment of the present disclosure can solve the problem of fatigue and dizziness of user's eyes. The near-eye display device based on light field display as provided by the embodiment of the present disclosure can provide an adjustment of eye focus within a certain depth range and can present natural 3D image, so that the image is displayed more vividly and eye fatigue caused by long-time observation can be avoided.

It should be explained that, in the embodiment of the present disclosure, the center C1 of the first virtual image 31, the center C2 of the second virtual image 32, the connecting line L0 of the center C1 of the first virtual image 31 and the center C2 of the second virtual image 32, the extension line of the connecting line L0 or the like are all virtual points or lines but are not really existed. The introduction of these virtual points or lines is for the purpose of clearly describing positions of the first virtual image 31 and the second virtual image 32, as well as positional relationships between the first virtual image 31, the second virtual image 32 and other elements.

For example, both the first virtual image 31 and the second virtual image 32 are enlarged images, the first virtual image 31 is an enlarged image of the first image and the second virtual image 32 is an enlarged image of the second image. For example, the first virtual image and the second virtual image 32 are enlarged by different scales.

For example, the center C1 of the first virtual image 31 may be a center of a pattern enclosed by an edge of the first virtual image 31. The center C2 of the second virtual image 32 may be a center of a pattern enclosed by an edge of the second virtual image 32, without limited thereto.

For example, the first linearly polarized light has a first polarization direction, the second linearly polarized light has a second polarization direction, and the first polarization direction is perpendicular to the second polarization direction. That is, the polarization direction of the first linearly polarized light is perpendicular to the polarization direction of the second linearly polarized light. For example, the first linearly polarized light is S-polarized light, and the second linearly polarized light is P-polarized light, without limited thereto.

For example, as illustrated in FIG. 1, the polarization splitting portion 14 includes a light incoming surface LIS which receives the first linearly polarized light and the second linearly polarized light. When light is incident on the light incoming surface LIS of the polarization splitting portion 14 at a non-vertical angle, the reflective characteristic and transmissive characteristic both are relied on the polarized phenomenon. Under such circumstance, a coordinate system as used is defined by a plane containing incident light and reflected light. If a polarization vector of light is located in this plane, the light is referred to as P-polarized light; if the polarization vector is perpendicular to this plane, the light is referred to as S-polarized light. Any incident, polarization state may be expressed as a vector sum of a S-component and a P-component. Linearly polarized light with P-polarization state may be referred to as P-polarized light, and linearly polarized light with S-polarization state may be referred to as S-polarized light.

For example, the polarization splitting portion 14 can reflect S-polarized light and transmit P-polarized light. Of course, the polarization splitting portion 14 can also reflect P-polarized light and transmit S-polarized light. That is, the polarization splitting portion 14 can be configured to reflect one of S-polarized light and P-polarized light and transmit the other one of S-polarized light and P-polarized light. The use of the polarization splitting portion 14 facilitates to fold the light path, and facilitates to reduce an entire size of the near-eye display device.

For example, particular arrangement of the polarization splitting portion 14 may be set according to actual demands, without particularly limited in the embodiment of the present disclosure. For example, the polarization splitting portion 14 may be a polarization beam splitting prism which can reflect S-polarized light (e.g., at a reflectivity greater than 90%), and transmit P-polarized light (e.g., at a transmittance greater than 90%). For example, the polarization splitting portion 14 may also be a wire grid polarizer. The wire grid polarizer can include a plurality of metal wires parallel to each other, and a width of each of the metal wires and a space between adjacent metal wires both are in an order of nanometer. When incident light is irradiated on the wire grid polarizer, the linearly polarized light with a polarization direction parallel to an extension direction of the metal wire is reflected, while the linearly polarized light with a polarization direction perpendicular to the extension direction of the metal wire is transmitted.

The near-eye display device provided by the embodiment of the present disclosure utilizes the time multiplexing method to convert light carried with image information to S-polarized light and P-polarized light according to a time sequence by cooperating with the polarization conversion portion, and to allow the S-polarized light and P-polarized light to be incident onto the polarization splitting portion by the projection portion; these two types of polarized light enter two different light paths, respectively, through the polarization splitting portion, pass through the phase retarder for two times and are reflected by the first reflective surface and the second reflective surface, respectively, and then enter the human eyes after passing through the polarization splitting portion again.

For example, the polarization conversion portion 12 is disposed in a transmission path of light of the first image and light of the second image. The polarization conversion portion 12 may be in two different conversion states. For example, when the polarization conversion portion 12 is in a first conversion state, it's configured to receive the light of the first image and converts the light of the first image to first linearly polarized light. When the polarization conversion portion 12 is in a second conversion state, it's configured to receive the light of the second image and converts the light of the second image to second linearly polarized light.

For example, the polarization conversion portion 12 may include one wire grid polarizer and one rotating motor, the wire grid polarizer may be disposed on the rotating motor. In the case where the display portion 11 displays the first image, rotating the wire grid polarizer by the rotating motor to bring the wire grid polarizer to the first conversion state so that the light of the first image is converted to first linearly polarized light. In the case where the display portion 11 displays the second image, rotating the wire grid polarizer by the rotating motor to bring the wire grid polarizer to the second conversion state so that the light of the second image is converted to second linearly polarized light.

For another example, the polarization conversion portion 12 may also include two wire grid polarizers and two rotating motors, and transmission axes of the two wire grid polarizers are perpendicular to each other. By adjusting positions of the two wire grid polarizers through the rotating motors, the polarization conversion portion 12 is brought into the first conversion state or the second conversion state. It should be explained that, particular arrangement of the polarization conversion portion 12 may be set according to actual demands, without particularly limited in the embodiment of the present disclosure.

The near-eye display device provided by the embodiment of the present disclosure realizes forming virtual images, from two types of polarized light, on a first image surface and a second surface, respectively, which are spaced apart by a certain distance by introducing the polarization conversion portion and by using the time multiplexing method, so as to realize natural, light field 3D display by deep merge. Such light field display device is capable of vividly displaying 3D objects and provides image information with different depths, so that a focal distance of user's eyes can be adjusted, and discomfort of human's eyes due to long-time focus on a same plane can be avoided.

For example, the first image and the second image as displayed by the display portion may be the same, and may also be different. When the first image is different from the second image, it's more useful for the perceived image surface to be changed, and is more useful for mitigating visual fatigue.

For example, in order to facilitate the deep merge of the first virtual image and the second virtual image, the first image surface 21 is parallel to the second image surface 22.

For example, as illustrated in FIG. 1, the first virtual image 31 and the second virtual image 21 are focused onto a same focus position P0. For example, a distance from the first virtual image 31 to the focus position is greater than 1 m and is smaller than 10 m; further, for example, the distance is greater than 2 m and is smaller than 4 m. For example, a distance from the second virtual image 32 to the focus position is greater than 1 m and is smaller than 10 m; further, for example, the distance is greater than 2 m and is smaller than 4 m. For example, the focus position is a position where the human eye is located. In this way, the distance from the focus position to the near-eye display device may also be referred to the above-mentioned distance from the eye to the near-eye display device, without repeatedly described herein. For example, as illustrated in FIG. 1, the first virtual image 31 is closer to the focus position P0 than the second virtual image 32 to the focus position P0.

For example, the projection portion 13 is configured to enlarge the first image and the second image to facilitate improving the display effect of the near-eye display device, and facilitate increasing the viewing angle. For example, as illustrated in FIG. 1, the viewing angle θ of the first virtual image 31 and the second virtual image 32 is greater than 40°. For example, the viewing angle θ of the first virtual image 31 and the second virtual image 32 is smaller than or equal to 60°. Further, for example, the viewing angle of the first virtual image 31 and the second virtual image 32 is greater than 45° and smaller than 60°. The projection portion 13 is configured to enlarge the first image and the second image according to scales. For example, the first image and the second image are enlarged by a same scale. For example, the projection portion 13 may be a projection lens which plays a role of enlarging the image, like a projector. For example, in some embodiments, the projection portion 13 may not be provided, and the polarization splitting portion 14 is configured to receive the first linearly polarized light and the second linearly polarized light. Under such circumstance, the display portion 11, the polarization conversion portion 12 and the image light transmission portion 15 are disposed sequentially.

For example, as illustrated in FIG. 1, for sake of clarity, only one convex lens is shown to represent the projection portion 13, without limited thereto. The projection portion 13 may include a convex lens, a concave lens or a combination thereof; and the amount of the convex lens and the concave lens may be set according to actual demands. The structure of the projection portion 13 may be determined according to actual demands.

In some other embodiments, the projection portion 13 may be configured to shrink the first image and the second image, respectively, according to scales.

For example, the image light transmission portion 15 includes a first image light transmission sub-portion 151 and a second image light transmission sub-portion 152; the first image light transmission sub-portion 151 and the second image light transmission sub-portion 152 are disposed at two sides of the polarization splitting portion 14, respectively; the first image light transmission sub-portion 151 is located at a side of the polarization splitting portion 14 where the light incoming surface LIS is located, and the second image light transmission sub-portion 152 is located at a side of the polarization splitting portion 14 opposite to the light incoming surface; and the extension line of the connecting line of centers of the first virtual image 31 and the second virtual image 32 passes through the first image light transmission sub-portion 151.

For example, as illustrated in FIG. 1, the display portion 11 and the second image light transmission sub-portion 152 are disposed opposite to each other. For example, an included angle between the display portion 11 and the polarization splitting portion 14 is an acute angle. Further, for example, the included angle between the display portion 11 and the polarization splitting portion 14 is 45°.

For example, the display portion 11 may be a displayer adopting Digital Light Procession (DLP) display technology, Liquid Crystal Display (LCD) technology or the like. The display portion 11 may be a micro-displayer, for example, organic light-emitting diode display device or liquid crystal display device, or the like. It should be explained that, the type, arranged position, arranged manner or the like of the display portion 11 may be set according to actual demands, without particularly limited in the embodiment of the present disclosure. For example, in order to meet customization requirements from users and to reduce the cost of the display system, the display portion 11 may be self-provided according to demands of the users.

For example, as illustrated in FIG. 1, the near-eye display device further includes a control unit 16, the control unit 16 may be connected to the polarization conversion portion 12 to control the polarization conversion portion 12. The control unit 16 controls the polarization conversion portion 12 to bring the polarization conversion portion 12 into a first conversion state or a second conversion state. For example, the control unit 16 may adopt a controller including a control circuit, without limited thereto. For example, the control circuit includes a sequential control circuit, without limited thereto.

For example, as illustrated in FIG. 1, the near-eye display device further includes an image rendering unit 17. The image rendering unit 17 is connected to the control unit 16 and the display portion 11, respectively. The control unit 16 is configured to control the image rendering unit 17. The image rendering unit 17 may be configured to generate data of the first image in the first time period, and to generate data of the second image in the second time period. The display portion 11 may be configured to generate the first image based on the data of the first image, and to generate the second image based on the data of the second image. For example, the image rendering unit 17 includes an image rendering circuit.

The control unit 16 controls the image rendering unit 17 to output the data of the required image to the display portion 11 according to the time sequence; the polarization state of the light of the image displayed by the display portion 11 is converted when the image passes through the polarization conversion portion 12 controlled by the control unit 16, so that the light of the displayed image is changed to S-polarized light or P-polarized light depending on the first time period and the second time period and is incident onto the polarization splitting portion, respectively, through the projection portion 13. For example, the image rendering unit 17 transmits the data of the first image and the data of the second image, alternately, to the display portion 11 according to a preset time sequence, so that the display portion 11 displays the first image and the second image alternately.

For example, as illustrated in FIG. 1, the first image light transmission sub-portion 151 includes a first phase retarder 511 and a first reflective surface 512, the first phase retarder 511 is closer to the polarization splitting portion 14 than the first reflective surface 512 to the polarization splitting portion 14; the first phase retarder 511 is configured to receive the first linearly polarized light emitted towards the first direction and convert the first linearly polarized light to first circularly polarized light; the first reflective surface 512 is configured to reflect the first circularly polarized light and convert the first circularly polarized light to second circularly polarized light; the first phase retarder 511 is further configured to receive the second circularly polarized light and convert the second circularly polarized light to third linearly polarized light; the third linearly polarized light is transmitted through the polarization splitting portion 14 to form the first virtual image 31 located in the first image surface 21.

For example, as illustrated in FIG. 1, the second image light transmission sub-portion 152 includes a second reflective surface 522 and a second phase retarder 521, the second phase retarder 521 is closer to the polarization splitting portion 14 than the second reflective surface 522 to the polarization splitting portion 14; the second phase retarder 521 is configured to receive the second linearly polarized light emitted towards the second direction and convert the second linearly polarized light to third circularly polarized light; the second reflective surface 522 is configured to reflect the third circularly polarized light and convert the third circularly polarized light to fourth circularly polarized light; the second phase retarder 521 is further configured to receive the fourth circularly polarized light and convert the fourth circularly polarized light to fourth linearly polarized light; the fourth linearly polarized light is reflected by the polarization splitting portion 14 to form the second virtual image 32 located in the second image surface 22.

For example, the first phase retarder 511 and the second phase retarder 521 both are quarter-wave plates.

For example, as illustrated in FIG. 1, the first reflective surface 512 and the second reflective surface 522 have different focal powers. Because the first reflective surface 512 and the second reflective surface 522 have different focal powers, light with two different polarization states enters the human eyes through two different light paths to form displayed images (the first virtual image and the second virtual image) which are spaced apart by a certain distance and are located in the first image surface and the second image surface, respectively; a deep merge of the images in the two image surfaces realizes light field display.

For example, the focal power represents the capability of the optical element to deflect light. Under the circumstance that a clear aperture of the optical element is given, the focal power is in inverse proportion to the focal distance of the optical element. That is, the smaller the focal distance is, the greater the focal power will be.

For example, the focal power of the first reflective surface 512 is greater than the focal power of the second reflective surface 522. In the embodiment of the present disclosure, reference is made to the case where the focal power of the first reflective surface 512 is greater than the focal power of the second reflective surface 522, by way of example. Of course, the focal power of the first reflective surface 512 may also be smaller than the focal power of the second reflective surface 522. Virtual images located in different image surfaces can be formed as long as the first reflective surface 512 and the second reflective surface 522 have different focal powers.

In order for consistent brightness of the first virtual image and the second virtual image, the first reflective surface 512 and the second reflective surface 522 have the same reflectivity, without limited thereto. The reflectivity of the first reflective surface 512 may also be different from that of the second reflective surface 522.

For example, as illustrated in FIG. 1, an included angle between the first phase retarder 511 and the polarization splitting portion 14 is an acute angle; an included angle between the second phase retarder 521 and the polarization splitting portion 14 is an acute angle. Further, for example, the included angle between the first phase retarder 511 and the polarization splitting portion 14 is 45°; the included angle between the second phase retarder 521 and the polarization splitting portion 14 is 45°. For example, an included angle between the first phase retarder 511 and the second phase retarder 521 is 90°.

For example, the first linearly polarized light and the fourth linearly polarized light have a first polarization direction; the second linearly polarized light and the third linearly polarized light have a second polarization direction; the first polarization direction is perpendicular to the second polarization direction. A rotation direction of the first circularly polarized light is opposite to a rotation direction of the second circularly polarized light; a rotation direction of the third circularly polarized light is opposite to a rotation direction of the fourth circularly polarized light. For example, the rotation direction includes left-handed rotation and right-handed rotation. Each of the circularly polarized light has one rotation direction.

For example, both the first linearly polarized light and the fourth linearly polarized light are S-polarized light, and both the second linearly polarized light and the third linearly polarized light are P-polarized light.

For example, as illustrated in FIG. 1, the center C1 of the first virtual image 31, the center C2 of the second virtual image 32 and a center of the first phase retarder 511 are located in the same straight line, without limited thereto.

Figure 2:
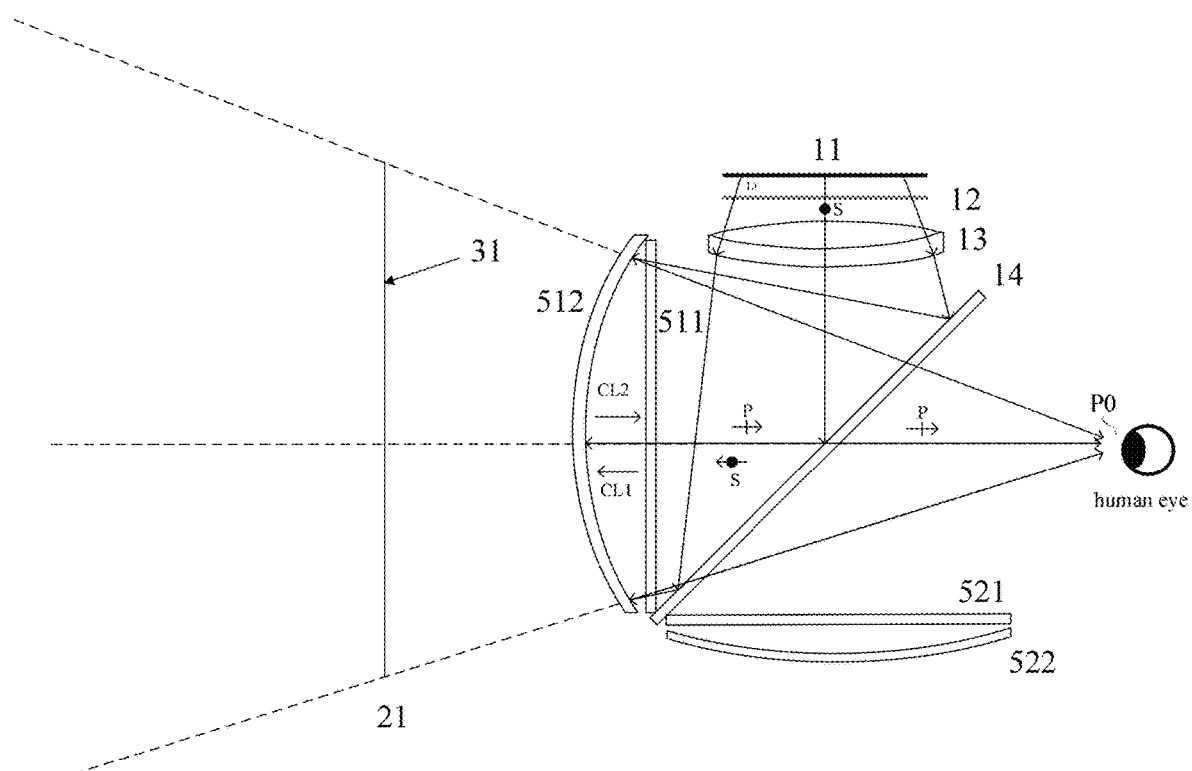
FIG. 2 is a light path diagram illustrating a display portion of a near-eye display device displaying a first image in a first time period, provided by an embodiment of the present disclosure.

FIG. 2 is a light path diagram illustrating a display portion of a near-eye display device displaying a first image in a first time period, provided by an embodiment of the present disclosure. Light L1 of the first image passes through the polarization conversion portion 12 and is converted to S-polarized light; the S-polarized light passes through the projection portion 13 and is projected to the polarization splitting portion 14; the S-polarized light projected to the polarization splitting portion 14 is reflected to pass through the first phase retarder 511 and is converted to first circularly polarized light CL1; the first circularly polarized light CL1 is reflected by the first reflective surface 512 and is converted to second circularly polarized light CL2; a rotation direction of the second circularly polarized light CL2 is different from that of the first circularly polarized light CL1. For example, one of rotation directions of the second circularly polarized light CL2 and the first circularly polarized light CL1 is left-handed rotation, and the other one of rotation directions of the second circularly polarized light CL2 and the first circularly polarized light CL1 is right-handed rotation. The second circularly polarized light CL2 passes through the first phase retarder 511 and is converted to P-polarized light. The P-polarized light is transmitted through the polarization splitting portion 14 and enters human eyes, so that the first virtual image 31 located in the first image surface 21 is observed by the human eyes.

Figure 3:
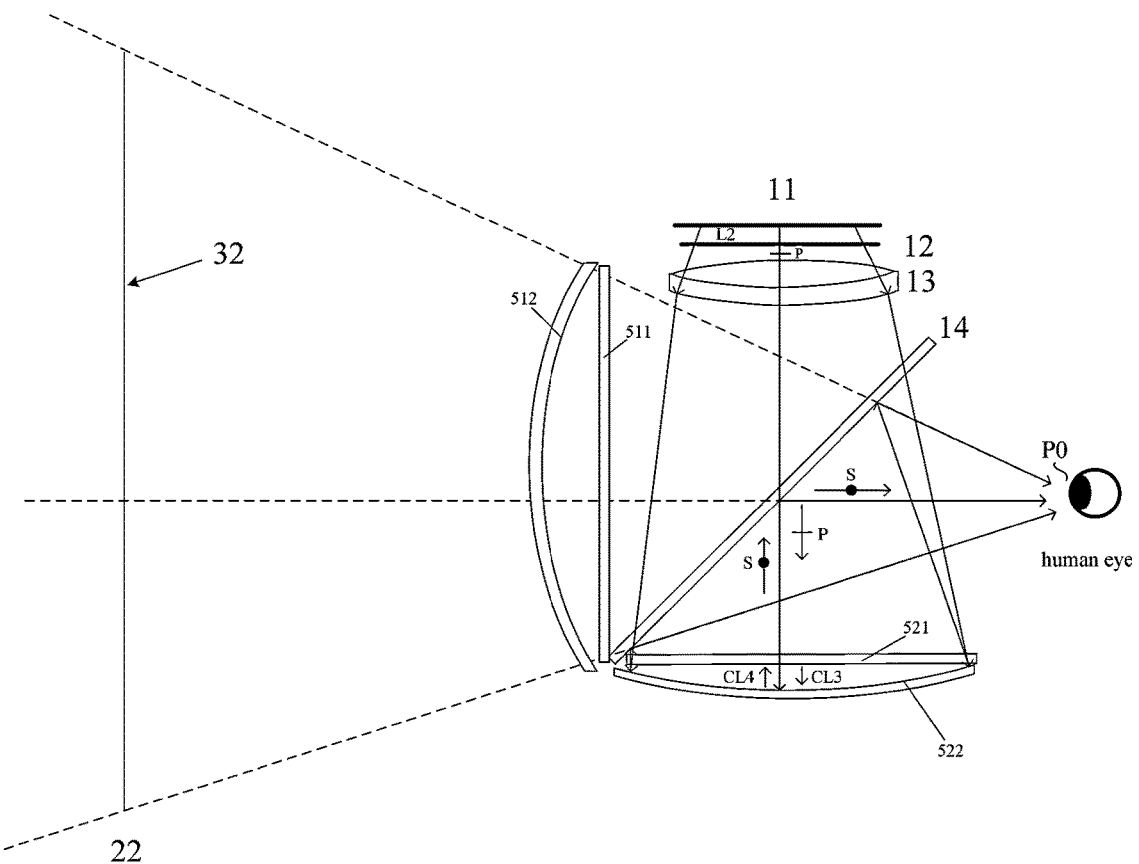
FIG. 3 is a light path diagram illustrating a display portion of a near-eye display device displaying a second image in a second time period, provided by an embodiment of the present disclosure.

FIG. 3 is a light path diagram illustrating a display portion of a near-eye display device displaying a second image in a second time period, provided by an embodiment of the present disclosure. Light L2 of the second image passes through the polarization conversion portion 12 and is converted to P-polarized light; the P-polarized light passes through the projection portion 13 and is projected to the polarization splitting portion 14; the P-polarized light projected to the polarization splitting portion 14 is transmitted through the polarization splitting portion 14, and passes through the second phase retarder 521 to be converted to third circularly polarized light CL3; the third circularly polarized light CL3 is reflected by the second reflective surface 522 and is converted to the fourth circularly polarized light CL4; a rotation direction of the fourth circularly polarized light CL4 is different from that of the third circularly polarized light CL3. For example, one of rotation directions of the third circularly polarized light CL3 and the fourth circularly polarized light CL4 is left-handed rotation, and the other one of rotation directions of the third circularly polarized light CL3 and the fourth circularly polarized light CL4 is right-handed rotation. The fourth circularly polarized light CL4 passes through the second phase retarder 521 and is converted to S-polarized light. The S-polarized light is reflected by the polarization splitting portion 14 and enters human eyes, so that the second virtual image 32 located in the second image surface 22 is observed by the human eyes.

By performing image rendering to the images located in different image surfaces, the first virtual image 31 and the second virtual image 32 are deeply merged to form an image in the perceived image surface, so as to realize light field display.

The near-eye display device provided by an embodiment of the present disclosure utilizes the polarization splitting portion to reduce the size of the device, and utilizes the time multiplexing method to form S-polarized light and P-polarized light having polarization directions perpendicular to each other; in this way, light is propagated in the light path of the near-eye display device without light energy loss, which improves the light transmission efficiency and reduces the power consumption.

FIG. 2 and FIG. 3 illustratively describe the light path of light L1 of the first image and the light path of light L2 of the second image, but the propagation direction of the light L1 of the first image and the propagation direction of the light L2 of the second image are not limited to those illustrated in FIG. 2 and FIG. 3. The light L1 of the first image and the light L2 of the second image further include light having other propagation directions.

As illustrated in FIGS. 1-3, for example, the polarization conversion portion 12 is configured to convert the polarization states of the light of the first image and the light of the second image, while the propagation direction of the light passing through the polarization conversion portion 12 remains unchanged. For example, the polarization conversion portion 12 converts the light of the first image and the light of the second image to have different polarization states. Further, for example, the polarization conversion portion 12 converts the light of the first image and the light of the second image to linearly polarized light having polarization directions perpendicular to each other. For example, the polarization splitting portion 14 modulates the incident light as reflected light or transmitted light according to the polarization state. For example, the propagation direction of the transmitted light transmitted through the polarization splitting portion 14 is as same as the propagation direction of the incident light, and the exiting direction of the reflected light reflected by the polarization splitting portion 14 complies with the law of reflection. For example, the polarization splitting portion 14 is configured to reflect one of S-polarized light and P-polarized light, and to transmit the other one of S-polarized light and P-polarized light. For example, the first phase retarder 511 is configured to convert linearly polarized light to circularly polarized light or convert circularly polarized light to linearly polarized light, and the propagation direction of the light passing through the first phase retarder 511 remains unchanged. For example, the second phase retarder 521 is configured to convert linearly polarized light to circularly polarized light or convert circularly polarized light to linearly polarized light, and the propagation direction of the light passing through the second phase retarder 521 remains unchanged. For example, the first reflective surface 512 is configured to reflect the light incident thereon, and is configured to convert the rotation direction of the circularly polarized light. For example, the first reflective surface 512 convers left-handed, circularly polarized light to right-handed, circularly polarized light; or converts right-handed, circularly polarized light to left-handed, circularly polarized light. For example, the second reflective surface 522 is configured to reflect the light incident thereon, and is configured to convert the rotation direction of circularly polarized light. For example, the second reflective surface 522 convers left-handed, circularly polarized light to right-handed, circularly polarized light; or converts right-handed, circularly polarized light to left-handed, circularly polarized light.

Figure 4:
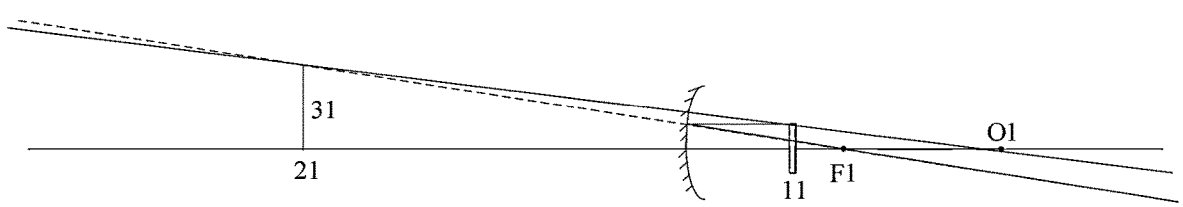
FIG. 4 is an equivalent light path diagram of a near-eye display device provided by an embodiment of the present disclosure in a first time period.

FIG. 4 is an equivalent light path diagram of a near-eye display device provided by an embodiment of the present disclosure in a first time period. The first image is subject to an optical process and then forms the first virtual image 31 at the first image surface 21. FIG. 4 illustrates a focal point F1 and an optic center O1 of an equivalent optical element.

Figure 5:
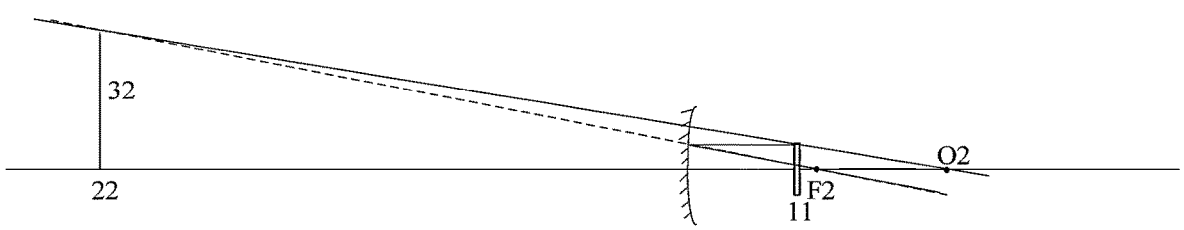
FIG. 5 is an equivalent light path diagram of a near-eye display device provided by an embodiment of the present disclosure in a second time period.

FIG. 5 is an equivalent light path diagram of a near-eye display device provided by an embodiment of the present disclosure in a second time period. The second image is subject to an optical process and then forms the second virtual image 32 at the second image surface 22. FIG. 5 illustrates a focal point F2 and an optic center O2 of an equivalent optical element.

The equivalent light path diagrams of the near-eye display device provided by the embodiment of the present disclosure in the first time period and the second time period are not limited to those illustrated in FIGS. 4-5. FIG. 4 and FIG. 5 illustrate the case where the equivalent optical element is a concave lens, by way of example. For example, the equivalent optical element in the first time period and the second time period may also be a convex lens.

Figure 6:
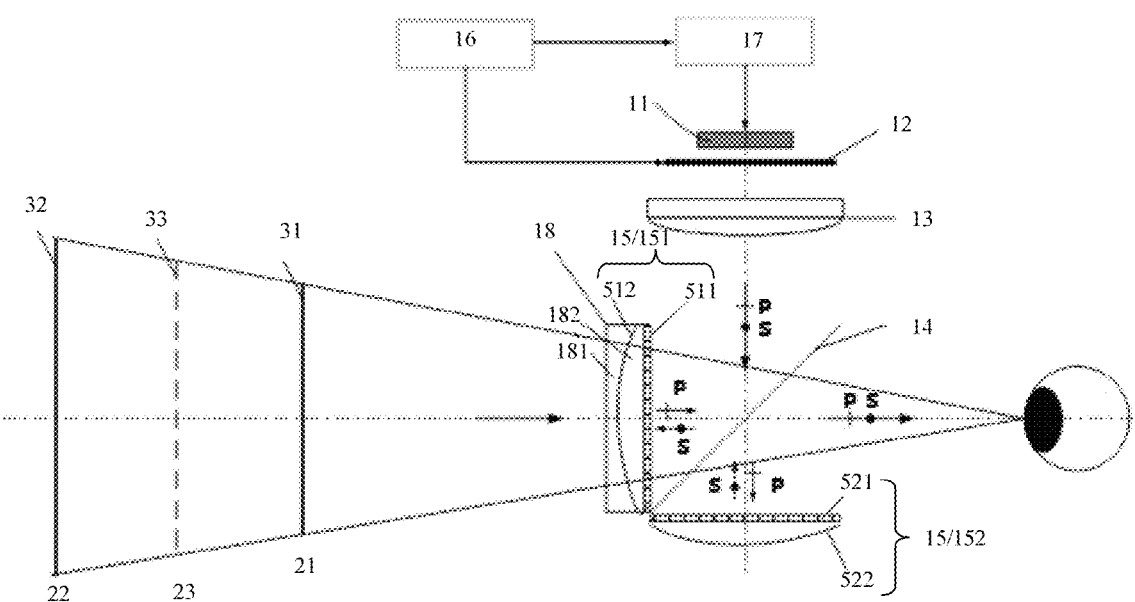
FIG. 6 is a schematic diagram of a near-eye display device provided by another embodiment of the present disclosure.

FIG. 6 is a schematic diagram of a near-eye display device provided by another embodiment of the present disclosure. For example, as illustrated in FIG. 6, the device further includes a transflective portion 18 configured to transmit ambient light. The transflective portion 18 includes a first transflective sub-portion 181 and a second transflective sub-portion 182; the first reflective surface 512 is located between the first transflective sub-portion 181 and the second transflective sub-portion 182; the first transflective sub-portion 181 and the second transflective sub-portion 182 have a same refractivity.

External ambient light passes through the transflective portion consisted of index-matching materials and then enters human eyes. Because the transflective portion 18 containing the first reflective surface has no focal power to the external ambient light, it has no influence to the external ambient light. As a result, the human eyes can simultaneously observe a superposition of a real environment and an image displayed by the light field, so as to realize augmented reality (AR) based on light field display, thereby providing an AR near-eye display device based on light field display.

For example, the transflective portion 18 is consisted of one layer of first reflective surface sandwiched by materials having the same refractivity; the first reflective surface may be plated with a transflective film, so that part of light emitted from the display portion is reflected to the human eyes. The first reflective surface has a certain focal power to the light emitted from the display portion, so as to enlarge the viewing angle; while the ambient light passing through the transflective portion will not be deflected, that is, the transflective portion has no focal power to the ambient light; as a result, a scene in the ambient environment is normally observed by human eyes. Thus, in the embodiment of the present disclosure, the image displayed by light field can be superposed with the scene in the ambient environment, which allows to achieve an AR near-eye display device based on light field display.

At least one embodiment of the present disclosure further provides a near-eye display method, which includes: displaying a first image in a first time period and displaying a second image in a second time period, by using a display portion 11; converting light of the first image to first linearly polarized light, and converting light of the second image to second linearly polarized light, by using a polarization conversion portion 12, a polarization direction of the first linearly polarized light being different from a polarization direction of the second linearly polarized light; projecting the first linearly polarized light and the second linearly polarized light by using a projection portion 13; receiving the first linearly polarized light and the second linearly polarized light projected by the projection portion 13, causing the first linearly polarized light to be emitted towards a first direction and causing the second linearly polarized light to be emitted towards a second direction, by using a polarization splitting portion 14, the first direction being different from the second direction; and transmitting the first linearly polarized light in the first time period to form a first virtual image 31 located in a first image surface 21, and transmitting the second linearly polarized light in the second time period to form a second virtual image 32 located in a second image surface 22, by using an image light transmission portion 15, the first image surface 21 being different from the second image surface 22, an extension line of a connecting line of centers of the first virtual image 31 and the second virtual image 32 passing through the polarization splitting portion 14.

For example, the method further includes: providing a transflective portion to transmit ambient light.

For example, receiving the first linearly polarized light emitted towards the first direction and converting the first linearly polarized light to first circularly polarized light, by using a first phase retarder; reflecting the first circularly polarized light and converting the first circularly polarized light to second circularly polarized light, by using a first reflective surface; receiving the second circularly polarized light and converting the second circularly polarized light to third linearly polarized light, by using the first phase retarder. The third linearly polarized light is transmitted through the polarization splitting portion to form the first virtual image located in the first image surface.

For example, receiving the second linearly polarized light emitted towards the second direction and converting the second linearly polarized light to third circularly polarized light, by using a second phase retarder; reflecting the third circularly polarized light and converting the third circularly polarized light to fourth circularly polarized light, by using a second reflective surface; receiving the fourth circularly polarized light and converting the fourth circularly polarized light to fourth linearly polarized light, by using the second phase retarder. The fourth linearly polarized light is reflected by the polarization splitting portion to form the second virtual image located in the second image surface.

For example, the first linearly polarized light and the fourth linearly polarized light have a first polarization direction; the second linearly polarized light and the third linearly polarized light have a second polarization direction; the first polarization direction is perpendicular to the second polarization direction; a rotation direction of the first circularly polarized light is opposite to a rotation direction of the second circularly polarized light; and a rotation direction of the third circularly polarized light is opposite to a rotation direction of the fourth circularly polarized light. For example, the first direction is perpendicular to the second direction, without limited thereto. An angle formed by the first direction and the second direction is determined by an included angle between the transmitted light transmitted through the polarization splitting portion 14 and the reflected light reflected by the polarization splitting portion 14.

Figure 7:
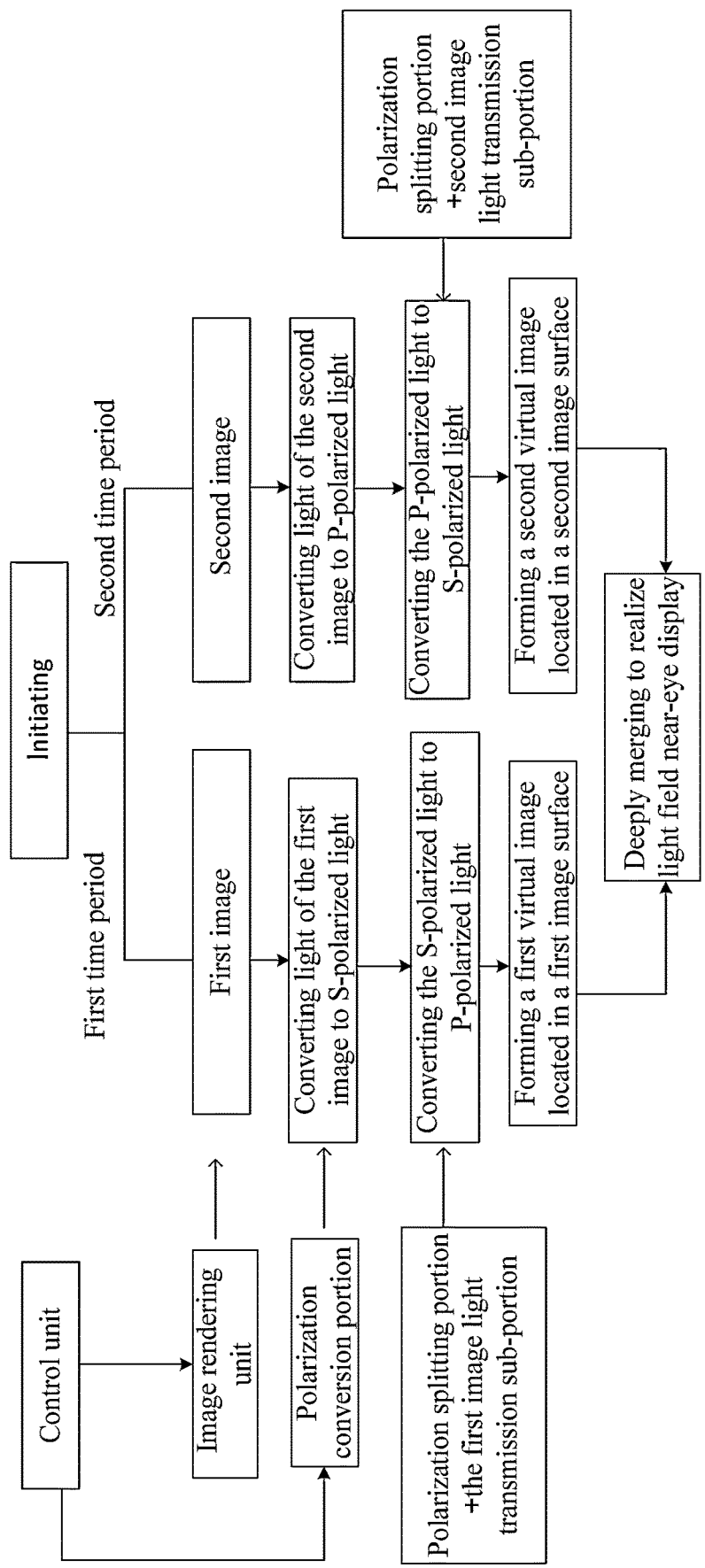
FIG. 7 is a working flow chart of a near-eye display device provided by an embodiment of the present disclosure.

FIG. 7 is a working flow chart of a near-eye display device provided by an embodiment of the present disclosure. As illustrated in FIG. 7, a first virtual image and a second virtual image are formed through different light paths in a first time period and a second period, respectively; the first virtual image and the second virtual image are deeply merged to realize light field display. Particular flows may also be referred to the related description of FIG. 2 and FIG. 3.

As illustrated in FIG. 7 in conjunction with FIG. 1, the working flow of the near-eye display device provided by an embodiment of the present disclosure is as follows.

(1) The control unit 16 controls the image rendering unit 17 to output required images to the display portion according to a time sequence; that is, displaying, by the display portion, a first image in a first time period, and to display a second image in a second time period.

(2) Converting light of the first image to S-polarized light in the first time period and converting light of the second image to P-polarized light in the second time period, by the polarization conversion portion 12.

(3) Converting, by the polarization splitting portion 14 and the first image light transmission sub-portion 151, the S-polarized light to P-polarized light in the first time period; and converting, by the polarization splitting portion 14 and the second image light transmission sub-portion 152, the P-polarized light to S-polarized light in the second time period; particular conversion of light path may be referred to FIG. 2 and FIG. 3, without repeatedly described herein.

(4) In the first time period, the P-polarized light being transmitted through the polarization splitting portion 14 to form the first virtual image 31 located in the first image surface 21; in the second time period, the S-polarized light being reflected by the polarization splitting portion 14 to form the second virtual image 32 located in the second image surface 22; the first image surface 21 being different from the second image surface 22.

(5) Deeply merging the first virtual image 31 and the second virtual image 32 to realize light field near-eye display.

For example, in the embodiment of the present disclosure, in the first time period, the light L1 of the first image, the first linearly polarized light (S-polarized light), the first circularly polarized light CL1, the second circularly polarized light CL2 and the third linearly polarized light (P-polarized light) are the same light beam at different positions of the same propagation path.

For example, in the embodiment of the present disclosure, in the second time period, the light L2 of the second image, the second linearly polarized light (P-polarized light), the third circularly polarized light CL3, the fourth circularly polarized light CIA and the fourth linearly polarized light (S-polarized light) are the same light beam at different positions of the same propagation path.

The embodiment of the present disclosure is described with reference to the case where the light of the first image is converted to S-polarized light in the first time period and the light of the second image is converted to P-polarized light in the second time period, by way of example, without limited thereto. It's also possible that, the light of the first image is converted to P-polarized light in the first time period and the light of the second image is converted to S-polarized light in the second time period; correspondingly, the polarization splitting portion 14 transmits P-polarized light in the first time period and reflects S-polarized light in the second time period; after subsequent light path modulation, virtual images located in different image surfaces are further formed.

The embodiment of the present disclosure is described with reference to the case where the polarization splitting portion 14 transmits P-polarized light and reflects S-polarized light, by way of example. In some other embodiments, the polarization splitting portion 14 may also reflect P-polarized light and transmit S-polarized light. Correspondingly, the P-polarized light reflected by the polarization splitting portion 14 is converted to S-polarized light upon processed by the first image light transmission sub-portion 151 and forms the first virtual image; the S-polarized light transmitted by the polarization splitting portion 14 is converted to P-polarized light upon processed by the second image light transmission sub-portion 152 and forms the second virtual image.

The near-eye display device provided by the embodiment of the present disclosure may further include one or more processors and one or more memories. The processor can process data signal, and may include various computing structures, for example, Complex Instruction Set Computer (CISC) structure, Reduced Instruction Set Computer (RISC) structure or a structure implementing combinations of various instruction sets. The memory can store instruction(s) and/or data executed by the processor(s). These instruction(s) and/or data may include code, and may be used for realizing some or all of the functions of one or more elements described in the embodiments of the present disclosure. For example, the memory includes Dynamic Random Access Memory (DRAM), Static Random Access Memory (SRAM), flash memory, optical memory or other memories well-known to those skilled in the art.

In some embodiments of the present disclosure, the control unit 16 and the image rendering unit 17 include code(s) and program(s) stored in the memory; the processor can execute the code(s) and program(s) to realize some or all of the functions of the above-described control unit 16 and image rendering unit 17.

In some embodiments of the present disclosure, the control unit 16 and the image rendering unit 17 may be special hardware devices for realizing some or all of the functions of the above-described control unit 16 and image rendering unit 17. For example, the control unit 16 and the image rendering unit 17 may be one circuit board or a combination of multiple circuit boards for realizing the above-described functions. In the embodiment of the present disclosure, the one circuit board or the combination of multiple circuit boards may include: (1) one or more processor; (2) one or more non-transient computer-readable memory connected to the processor(s); and (3) a firmware executable by the processor and stored in the memory.

In case of no conflict, features in one embodiment or in different embodiments of the present disclosure can be combined.

The above are merely particular embodiments of the present disclosure but are not limitative to the scope of the present disclosure; any of those skilled familiar with the related arts can easily conceive variations and substitutions in the technical scopes disclosed by the present disclosure, which should be encompassed in protection scopes of the present disclosure. Therefore, the scopes of the present disclosure should be defined in the appended claims.

What is claimed is:

1. A near-eye display device, comprising:
   a display portion, configured to display a first image in a first time period and display a second image in a second time period;
   a polarization conversion portion, configured to convert light of the first image to first linearly polarized light, and convert light of the second image to second linearly polarized light, a polarization direction of the first linearly polarized light being different from a polarization direction of the second linearly polarized light;
   a polarization splitting portion, configured to receive the first linearly polarized light and the second linearly polarized light, cause the first linearly polarized light to be emitted towards a first direction and cause the second linearly polarized light to be emitted towards a second direction, the first direction being different from the second direction; and
   an image light transmission portion, configured to transmit the first linearly polarized light in the first time period, and configured to transmit the second linearly polarized light in the second time period,
   wherein the image light transmission portion is configured to transmit the first linearly polarized light in the first time period and form a first virtual image located in a first image surface, and is configured to transmit the second linearly polarized light in the second time period and form a second virtual image located in a second image surface, the first image surface is different from the second image surface, and an extension line of a connecting line of centers of the first virtual image and the second virtual image passes through the polarization splitting portion.

2. The near-eye display device according to claim 1, wherein the display portion, the polarization conversion portion, and the image light transmission portion are disposed sequentially.

3. The near-eye display device according to claim 1, further comprising a projection portion, wherein the projection portion is located between the display portion and the polarization conversion portion; the projection portion is configured to project the first linearly polarized light and the second linearly polarized light; and the polarization splitting portion is configured to receive the first linearly polarized light and the second linearly polarized light as projected by the projection portion.

4. The near-eye display device according to claim 1, wherein the first virtual image and the second virtual image are focused to a same focus position;

a distance from the first virtual image to the focus position is greater than 1 m and is smaller than 10 m; and a distance from the second virtual image to the focus position is greater than 1 m and is smaller than 10 m.

5. The near-eye display device according to claim 1, wherein a viewing angle of the first virtual image and a viewing angle of the second virtual image both are greater than 40°.

6. The near-eye display device according to claim 1, wherein the first image surface is parallel to the second image surface.

7. The near-eye display device according to claim 1, wherein the polarization splitting portion comprises a light incoming surface configured to receive the first linearly polarized light and the second linearly polarized light;

the image light transmission portion comprises a first image light transmission sub-portion and a second image light transmission sub-portion, the first image light transmission sub-portion and the second image light transmission sub-portion are disposed at two sides of the polarization splitting portion, respectively;

the first image light transmission sub-portion is located at a side of the polarization splitting portion where the light incoming surface is located, and the second image light transmission sub-portion is located at a side of the polarization splitting portion opposite to the light incoming surface; and the extension line of the connecting line of centers of the first virtual image and the second virtual image passes through the first image light transmission sub-portion.

8. The near-eye display device according to claim 7, wherein the first image light transmission sub-portion comprises a first phase retarder and a first reflective surface, the first phase retarder is closer to the polarization splitting portion than the first reflective surface to the polarization splitting portion; the first phase retarder is configured to receive the first linearly polarized light emitted towards the first direction and convert the first linearly polarized light to first circularly polarized light; the first reflective surface is configured to reflect the first circularly polarized light and convert the first circularly polarized light to second circularly polarized light; the first phase retarder is further configured to receive the second circularly polarized light and convert the second circularly polarized light to third linearly polarized light; the third linearly polarized light is transmitted through the polarization splitting portion to form the first virtual image located in the first image surface; and the second image light transmission sub-portion comprises a second reflective surface and a second phase retarder, the second phase retarder is closer to the polarization splitting portion than the second reflective surface to the polarization splitting portion; the second phase retarder is configured to receive the second linearly polarized light emitted towards the second direction and convert the second linearly polarized light to third circularly polarized light; the second reflective surface is configured to reflect the third circularly polarized light and convert the third circularly polarized light to fourth circularly polarized light; the second phase retarder is further configured to receive the fourth circularly polarized light and convert the fourth circularly polarized light to fourth linearly polarized light; the fourth linearly polarized light is reflected by the polarization splitting portion to form the second virtual image located in the second image surface.

9. The near-eye display device according to claim 8, wherein a focal power of the first reflective surface is different from a focal power of the second reflective surface.

10. The near-eye display device according to claim 8, wherein a reflectivity of the first reflective surface is the same as a reflectivity of the second reflective surface.

11. The near-eye display device according to claim 8, wherein an included angle between the first phase retarder and the polarization splitting portion is an acute angle; and an included angle between the second phase retarder and the polarization splitting portion is an acute angle.

12. The near-eye display device according to claim 8, further comprising a transflective portion, wherein the transflective portion is configured to transmit ambient light, the transflective portion comprises a first transflective sub-portion and a second transflective sub-portion, the first reflective surface is located between the first transflective sub-portion and the second transflective sub-portion, and a refractivity of the first transflective sub-portion is the same as a refractivity of the second transflective sub-portion.

13. The near-eye display device according to claim 8, wherein the first linearly polarized light and the fourth linearly polarized light have a first polarization direction; the second linearly polarized light and the third linearly polarized light have a second polarization direction; the first polarization direction is perpendicular to the second polarization direction, a rotation direction of the first circularly polarized light is opposite to a rotation direction of the second circularly polarized light; and a rotation direction of the third circularly polarized light is opposite to a rotation direction of the fourth circularly polarized light.

14. The near-eye display device according to claim 13, wherein both the first linearly polarized light and the fourth linearly polarized light are S-polarized light, and both the second linearly polarized light and the third linearly polarized light are P-polarized light.

15. A near-eye display method, comprising:

displaying a first image in a first time period and displaying a second image in a second time period, by using a display portion;

converting light of the first image to first linearly polarized light, and converting light of the second image second linearly polarized light, by using a polarization conversion portion, a polarization direction of the first linearly polarized light being different from a polarization direction of the second linearly polarized light;

receiving the first linearly polarized light and the second linearly polarized light, causing the first linearly polarized light to be emitted towards a first direction and causing the second linearly polarized light to be emitted towards a second direction, by using a polarization splitting portion, the first direction being different from the second direction; and transmitting the first linearly polarized light in the first time period and transmitting the second linearly polarized light in the second time period, by using an image light transmission portion, the near-eye display method further comprising:

transmitting the first linearly polarized light in the first time period to form a first virtual image located in a first image surface, and transmitting the second linearly polarized light in the second time period to form a second virtual image located in a second image surface, by using the image light transmission portion; wherein the first image surface is different from the second image surface; and an extension line of a connecting line of centers of the first virtual image and the second virtual image passes through the polarization splitting portion.

16. The near-eye display method according to claim 15, further comprising:

projecting the first linearly polarized light and the second linearly polarized light, by using a projection portion; and receiving the first linearly polarized light and the second linearly polarized light as projected by the projection portion, by using the polarization splitting portion.

17. The near-eye display method according to claim 15, further comprising: providing a transflective portion to transmit ambient light.

18. A near-eye display method, comprising:

displaying a first image in a first time period and displaying a second image in a second time period, by using a display portion;

converting light of the first image to first linearly polarized light, and converting light of the second image to second linearly polarized light, by using a polarization conversion portion, a polarization direction of the first linearly polarized light being different from a polarization direction of the second linearly polarized light;

receiving the first linearly polarized light and the second linearly polarized light, causing the first linearly polarized light to be emitted towards a first direction and causing the second linearly polarized light to be emitted towards a second direction, by using a polarization splitting portion, the first direction being different from the second direction; and transmitting the first linearly polarized light in the first time period and transmitting the second linearly polarized light in the second time period, by using an image light transmission portion, the near-eye display method further comprising:

providing a transflective portion to transmit ambient light;

receiving the first linearly polarized light emitted towards the first direction and converting the first linearly polarized light to first circularly polarized light, by using a first phase retarder; reflecting the first circularly polarized light and converting the first circularly polarized light to second circularly polarized light, by using a first reflective surface; receiving the second circularly polarized light and converting the second circularly polarized light to third linearly polarized light, by using the first phase retarder, wherein the third linearly polarized light is transmitted through the polarization splitting portion to form a first virtual image located in the first image surface; and receiving the second linearly polarized light emitted towards the second direction and converting the second linearly polarized light to third circularly polarized light, by using a second phase retarder; reflecting the third circularly polarized light and converting the third circularly polarized light to fourth circularly polarized light, by using a second reflective surface; receiving the fourth circularly polarized light and converting the fourth circularly polarized light to fourth linearly polarized light, by using the second phase retarder, wherein the fourth linearly polarized light is reflected by the polarization splitting portion to form a second virtual image located in the second image surface, wherein the first linearly polarized light and the fourth linearly polarized light have a first polarization direction; the second linearly polarized light and the third linearly polarized light have a second polarization direction; the first polarization direction is perpendicular to the second polarization direction, a rotation direction of the first circularly polarized light is opposite to a rotation direction of the second circularly polarized light; and a rotation direction of the third circularly polarized light is opposite to a rotation direction of the fourth circularly polarized light.

19. The near-eye display method according to claim 17, further comprising:

receiving the first linearly polarized light emitted towards the first direction and converting the first linearly polarized light to first circularly polarized light, by using a first phase retarder; reflecting the first circularly polarized light and converting the first circularly polarized light to second circularly polarized light, by using a first reflective surface; receiving the second circularly polarized light and converting the second circularly polarized light to third linearly polarized light, by using the first phase retarder, wherein the third linearly polarized light is transmitted through the polarization splitting portion to form the first virtual image located in the first image surface; and receiving the second linearly polarized light emitted towards the second direction and converting the second linearly polarized light to third circularly polarized light, by using a second phase retarder; reflecting the third circularly polarized light and converting the third circularly polarized light to fourth circularly polarized light, by using a second reflective surface; receiving the fourth circularly polarized light and converting the fourth circularly polarized light to fourth linearly polarized light, by using the second phase retarder, wherein the fourth linearly polarized light is reflected by the polarization splitting portion to form a second virtual image located in the second image surface, wherein the first linearly polarized light and the fourth linearly polarized light have a first polarization direction; the second linearly polarized light and the third linearly polarized light have a second polarization direction; the first polarization direction is perpendicular to the second polarization direction, a rotation direction of the first circularly polarized light is opposite to a rotation direction of the second circularly polarized light; and a rotation direction of the third circularly polarized light is opposite to a rotation direction of the fourth circularly polarized light.

* * * * *